(12) United States Patent
Pfeilschifter et al.

(10) Patent No.: US 11,285,825 B2
(45) Date of Patent: *Mar. 29, 2022

(54) ALTERNATING-CURRENT CHARGING DEVICE FOR A MOTOR VEHICLE, AND METHOD FOR OPERATING AN ALTERNATING-CURRENT CHARGING DEVICE FOR A MOTOR VEHICLE

(71) Applicant: VITESCO TECHNOLOGIES GMBH, Hannover (DE)

(72) Inventors: Franz Pfeilschifter, Munich (DE); Martin Goetzenberger, Munich (DE); Klaus Muehlbauer, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/978,834

(22) PCT Filed: Feb. 25, 2019

(86) PCT No.: PCT/EP2019/054555
§ 371 (c)(1),
(2) Date: Sep. 8, 2020

(87) PCT Pub. No.: WO2019/170457
PCT Pub. Date: Sep. 12, 2019

(65) Prior Publication Data
US 2020/0406768 A1  Dec. 31, 2020

(30) Foreign Application Priority Data
Mar. 8, 2018  (DE) .......................... 102018203489

(51) Int. Cl.
*B60L 53/14*  (2019.01)
*H02J 7/04*  (2006.01)
(Continued)

(52) U.S. Cl.
CPC ................. *B60L 53/14* (2019.02); *B60L 3/04* (2013.01); *H02J 7/04* (2013.01); *B60L 53/22* (2019.02);
(Continued)

(58) Field of Classification Search
CPC ...... B60L 53/14; B60L 53/22; B60L 2210/10; B60L 3/04; H02J 7/04; H02J 2207/20
(Continued)

(56) References Cited

U.S. PATENT DOCUMENTS 4,920,448 A   4/1990  Bonhomme
9,193,272 B2  11/2015  Fassnacht et al.
(Continued)

FOREIGN PATENT DOCUMENTS

CN  106160525 A  11/2016
DE    3688469 T2  10/1993
(Continued)

*Primary Examiner* — Sun J Lin
(74) *Attorney, Agent, or Firm* — Laurence A. Greenberg; Werner H. Stemer; Ralph E. Locher

(57) ABSTRACT

An AC charging device for a motor vehicle has a neutral conductor, at least one phase conductor, and at least one rectifier. The neutral conductor and the at least one phase conductor are connected to the rectifier, to which at least one smoothing capacitor is also connected. The AC charging device has a precharge circuit arranged between a mains connection and the at least one smoothing capacitor. The precharge circuit is designed to precharge the at least one smoothing capacitor. The precharge circuit has at least one transistor.

15 Claims, 7 Drawing Sheets

(51) Int. Cl.
*B60L 3/04* (2006.01)
*B60L 53/22* (2019.01)
(52) U.S. Cl.
CPC ....... *B60L 2210/10* (2013.01); *H02J 2207/20* (2020.01)
(58) Field of Classification Search
USPC ........................................................ 320/109
See application file for complete search history.

(56) References Cited

U.S. PATENT DOCUMENTS

| | | |
|---|---|---|
| 10,587,205 B2 | 3/2020 | Tazaki et al. |
| 2012/0212986 A1 | 8/2012 | Minami et al. |
| 2012/0306264 A1 | 12/2012 | Komma et al. |
| 2019/0006951 A1 | 1/2019 | Huggenberger |
| 2020/0406768 A1* | 12/2020 | Pfeilschifter et al. .... H02J 7/02 |
| 2021/0008984 A1* | 1/2021 | Pfeilschifter et al. .. B60L 53/14 |
| 2021/0155101 A1* | 5/2021 | Pfeilschifter et al. .. B60L 53/14 |

FOREIGN PATENT DOCUMENTS

| | | |
|---|---|---|
| DE | 102009029091 A1 | 3/2011 |
| DE | 102010007452 A1 | 8/2011 |
| DE | 102016009665 A1 | 2/2018 |
| WO | 2017093273 A1 | 6/2017 |
| WO | 2017159078 A1 | 9/2017 |

* cited by examiner

ALTERNATING-CURRENT CHARGING DEVICE FOR A MOTOR VEHICLE, AND METHOD FOR OPERATING AN ALTERNATING-CURRENT CHARGING DEVICE FOR A MOTOR VEHICLE

BACKGROUND OF THE INVENTION

Field of the Invention

The invention relates to an AC charging device for a motor vehicle. The AC charging device has at least one smoothing capacitor and one precharge circuit for precharging the smoothing capacitor.

AC charging devices are known. An AC charging device may be used to supply energy to an on-board power system of a motor vehicle, or else to charge a traction battery of the motor vehicle. The AC charging device is designed to receive AC current from a mains and to output DC current to an on-board power system of a motor vehicle.

The AC charging device usually has at least one smoothing capacitor. The smoothing capacitor reduces any residual ripple or an AC current component that remains after the AC current has been rectified. The smoothing capacitor is usually precharged by a precharge circuit before a mains disconnection contactor, which establishes a connection between a mains and the smoothing capacitor, is closed. The precharge circuit in this case usually has just one precharge resistor. As a result of the precharging, the smoothing capacitor is usually brought to the voltage level of the mains with a delay. The precharge circuit thus avoids an abrupt breakdown of the voltage of the mains on the smoothing capacitor.

One disadvantage of the known precharge circuit is that, even if a mains connection of the AC charging device is not connected to the mains, the mains connection of the AC charging device is subjected to a voltage from an energy store of the motor vehicle. In order for the mains connection in the known AC charging device to be safe, it is protected with a protective cover, for example. The protective cover is intended to prevent direct personal contact from outside with the mains connection. Nevertheless, there is still a risk of contact.

SUMMARY OF THE INVENTION

One object of the present invention is to provide an AC charging device and a method by way of which or in the case of which a motor vehicle is able to be operated more safely.

This object is achieved by way of an AC charging device and a method as claimed in the independent claims.

An AC charging device according to the invention for a motor vehicle has a neutral conductor, at least one phase conductor, in particular three phase conductors, and at least one in particular passive rectifier. The neutral conductor and the phase conductor are connected to the rectifier, in particular to an AC side of the rectifier. At least one smoothing capacitor is likewise connected to the rectifier, in particular to a DC side of the rectifier. The AC charging device furthermore has a precharge circuit arranged between a mains connection of the AC charging device and the smoothing capacitor, which is preferably the first smoothing capacitor viewed from the mains connection of the phase conductor. The precharge circuit is provided between the rectifier and the mains connection. The precharge circuit is designed to precharge the smoothing capacitor. What is provided as one important concept of the invention is that the precharge circuit has at least one in particular normally off or self-blocking transistor.

The invention is based on the finding that the AC charging device is able to be made safer if the precharge circuit has the transistor. As a result of the transistor, the mains connection of the AC charging device is able to be switched to a voltage-free state. The transistor is designed for this purpose through its connection within the precharge circuit. The precharge circuit comprises the transistor and in particular a precharge resistor. The transistor and the precharge resistor are connected in series. The transistor and the precharge resistor bypass a mains disconnection contactor via which the mains connection is connected to the rectifier. If the transistor is open and if the mains disconnection contactor is as well, then the rectifier and in particular the smoothing capacitor are disconnected from the mains connection. The precharge circuit is connected in the AC charging device such that, when the mains disconnection contactor is open, there is only a single current path that is able to be closed or completely isolated by way of the transistor of the precharge circuit.

The motor vehicle is thereby able to be operated more safely when the AC charging device is no longer connected to the mains, but for example the contacts or the respective mains connection is exposed or unprotected.

The service life of the AC charging device is furthermore also able to be increased, since the components of the AC charging device are thereby possibly not unnecessarily live. The AC charging device may for example also be switched to a voltage-free state in the event that the AC charging device is still connected to the mains, but the traction battery is not (no longer) being charged.

The AC charging device is designed in particular as a three-phase current charging device. The AC charging device thereby in particular has three phase conductors. Each of the phase conductors may have the precharge circuit with the transistor. This means that the mains connection of each individual phase conductor is able to be switched to a voltage-free state if the mains connection is not connected to the mains.

The AC charging device is in particular designed with at least one cross-connection line, such that at least two phase conductors are connected to one another via the cross-connection line. This is advantageous since a plurality of branches of the AC charging device may be used by the cross-connection line, even if the AC charging device is connected to the mains only via a single phase conductor. The transistor is particularly advantageous in this case since otherwise, when a cross-connection switch of the cross-connection line is closed, there would be a mains short-circuit across a precharge resistor, so to speak.

The precharge circuit in particular has at least one precharge resistor. The precharge circuit may either be arranged in parallel with a cross-connector and in parallel with a mains disconnection contactor, or else in parallel with three mains disconnection contactors, or in parallel either with the mains disconnection contactors or the cross-connection switches. Assuming that only a first phase conductor of the phase conductors is connected to the mains, then there is provision for the precharge circuit in the first phase conductor to be arranged in parallel with the mains disconnection contactor of the first phase conductor, since there is no corresponding cross-connection switch, in particular for the first phase conductor. The precharge circuit is a passive precharge circuit and therefore only enables a current path for the precharging, without however having a current source or a converter itself.

When a voltage is applied to the mains connection via the mains, the smoothing capacitor is therefore first of all precharged via the precharge circuit, in particular via the closed transistor and the precharge resistor. The mains disconnection contactor of the phase conductor is open during the precharging. The mains disconnection contactor is preferably closed only when the smoothing capacitor has been sufficiently precharged via the precharge circuit.

There is preferably provision for the precharge circuit to have a diode in addition to the transistor. The reverse directions of an inverse diode of the transistor and of the diode oppose one another. This enables complete separation of the precharging path or the precharge circuit for each polarity or phase position in the phase in question. The diode is preferably arranged upstream of the transistor with respect to the smoothing capacitor. The order may however also be reversed. The diode is designed to be blocking in the direction from the rectifier to the mains connection. The diode makes it possible to prevent current from flowing back via the precharge circuit, that is to say from the smoothing capacitor in the direction of the mains connection, as triggered by the mains curve. Even when the transistor is closed, no current is able to flow back through the diode from the smoothing capacitor in the direction of the mains connection via the precharge circuit. The AC charging device is thereby able to be operated more safely. The AC charging device may furthermore thereby be designed in a simple manner with the cross-connection lines. The precharge circuit additionally comprises the precharge resistor. The precharge resistor, the transistor and the diode are connected in series. This series circuit (or the ends thereof) is connected in parallel with the mains disconnection contactor or bypasses it. Instead of the diode, a further transistor may also be provided. The further transistor has an inverse diode that has the same features as the diode, in particular with regard to its reverse direction and the connection within the precharge circuit.

There is furthermore preferably provision for the precharge circuit to be arranged in the phase conductor. There is in particular provision for the precharge circuit to be arranged in the first phase conductor of the phase conductors. The first phase conductor is preferably connected just to the mains. It may be the case for example that only the first phase conductor is connected to the mains. It is therefore advantageous also to arrange the precharge circuit in the first phase conductor. The respective precharge circuit of a second phase conductor or of a third phase conductor may for example be in a cross-connection line that electrically connects the first phase conductor and the second phase conductor or the first phase conductor or the third phase conductor, in particular directly, to one another. A mains disconnection contactor may be provided in the phase conductor, with which mains disconnection contactor the precharge circuit is connected in parallel (that is to say so as to bypass it).

There is furthermore preferably provision for the phase conductor and at least one further phase conductor of the AC charging device to be connected by way of a cross-connection line.

In addition, the cross-connection line preferably has a cross-connection switch for disconnecting the phase conductor and the further phase conductor.

The phase conductors may be connected to one another through the cross-connection line. The connection is provided in particular when only one of the phase conductors is connected to the mains, but a plurality of branches of the AC charging device are intended to be used for charging. Charging is thus able to be performed through the cross-connection line even with a current strength greater than 16 A, for example, since each individual branch of the AC charging device is designed only for a maximum of 16 A, for example. It may thus for example be the case that the correct charging connection is not available to connect the mains connection of the AC charging device to more than one phase conductor. The mains is then electrically connected only to a single mains connection, in particular of the first phase conductor. The current strength with which the on-board power system of the motor vehicle is supplied, in particular with which a battery of the motor vehicle is charged, may however be charged with preferably three times 16 A despite the mains connection to only one mains connection of the phase conductor or one pin of a plug connection of the AC charging device.

The cross-connection line in particular also has the cross-connection switch, which may be formed in parallel with one of the precharge circuits. The cross-connection line may be interrupted by the cross-connection switch.

There is furthermore preferably provision for a further precharge circuit, designed identically to the precharge circuit, to be formed in the cross-connection line. A smoothing capacitor from a second branch of the AC charging device and/or a smoothing capacitor from a third branch of the AC charging device may then also be precharged by the further precharge circuit. The AC charging device is able to be operated more safely as a result of the precharge circuit with the transistor of the at least one cross-connection line.

There is furthermore preferably provision for the precharge circuit to be arranged in the neutral conductor (and in particular not in a phase of the charging device). By arranging the precharge circuit in the neutral conductor, the at least one precharge circuit in the phase conductor or in the cross-connection line may be dispensed with. By arranging the precharge circuit in the neutral conductor, only a single precharge circuit is then sufficient to be able to safely operate the AC charging device with three branches and, for example, only one phase conductor connected to the mains. By arranging the precharge circuit in the neutral conductor, it is thus possible for example to save on two precharge circuits.

There is furthermore preferably provision for the AC charging device to have a mains disconnection contactor between the mains connection and the rectifier and a mains disconnection circuit formed in parallel with the mains disconnection contactor. As a result of the mains disconnection circuit arranged in parallel with the mains disconnection contactor, an arc extinguishing chamber may be dispensed with. The mains disconnection contactor may thus be formed without the arc extinguishing chamber due to the mains disconnection circuit. In electrical power engineering, the arc extinguishing chamber is a device for extinguishing sparks of switching arcs as occur when high electric currents are switched off, typically in the event of an electrical short circuit. When switching off high currents, a switching arc occurs between the contacts when the contacts are separated. This arc, formed from ionized air, leads to contact erosion even when the contacts are separated as quickly as possible, and has to be extinguished or deionized as quickly as possible in order to avoid consequential damage. As a result of the mains disconnection circuit, the contacts may however be separated without ion chambers. The mains disconnection circuit is thus closed for this purpose. The mains disconnection contactor may then be opened without causing a switching arc, since the current is able to flow away through the mains disconnection circuit. If the mains disconnection contactor and the mains disconnection circuit are closed at the same time, then the current flows in particular essentially through the mains disconnection contactor and not through the higher-resistance mains disconnection circuit. The mains disconnection contactor is preferably designed to have a lower resistance than the mains disconnection circuit.

There is in particular provision for the precharge circuit to be formed in parallel with the mains disconnection contactor. As a result of the arrangement of the precharge circuit in parallel with the mains disconnection contactor, the smoothing capacitor may be precharged with energy from the mains via the precharge circuit if the mains disconnection contactor and/or the mains disconnection circuit is open.

There is preferably also provision for the precharge circuit to be formed in parallel with the mains disconnection circuit. As a result of the arrangement of the precharge circuit in parallel with the mains disconnection circuit, the smoothing capacitor may also be precharged with energy from the mains via the precharge circuit if the mains disconnection circuit is open.

There is furthermore preferably provision for the mains disconnection circuit to have two semiconductor elements. The two semiconductor elements make the mains disconnection circuit safer and more reliable. The AC charging device is thereby able to be operated more safely.

There is furthermore preferably provision for the semiconductor elements of the mains disconnection circuit to be connected as two transistors connected to one another in antiseries. It is thus possible to achieve a situation whereby the current is also able to flow in the direction of the mains connection downstream of the mains disconnection circuit.

There is furthermore preferably provision for one semiconductor element of the two semiconductor elements of the mains disconnection circuit to be designed as a diode. The mains disconnection circuit is able be designed more inexpensively as a result of the diode. The power switching of the mains disconnection circuit may then however only be possible for one half-cycle (either positive half-cycle or negative half-cycle).

There is furthermore preferably provision for the precharge circuit to be electrically connected, in particular directly, to a connection point between the two semiconductor elements of the mains disconnection circuit. The precharge circuit is thereby preferably connected in series with one of the semiconductor elements of the mains disconnection circuit. It is thereby possible to save on a diode of the precharge circuit, and the precharge circuit may be designed without a diode.

There is furthermore provision for the AC charging device to have a further mains disconnection contactor between the mains connection and the rectifier and a further mains disconnection circuit formed in parallel with the mains disconnection contactor, and for the further mains disconnection contactor to be formed in series with the precharge circuit. An emergency shutdown or an emergency disconnection of the connection between the AC charging device and the mains is able to take place reliably as a result of the further mains disconnection contactor and the further mains disconnection circuit. The emergency disconnection device is thus designed to be redundant. It may thus for example be the case that the mains disconnection contactor cannot be opened because the contacts of the mains disconnection contactor are inseparably connected to one another. This may occur for example if the mains disconnection contactor becomes stuck, for example if one or more contacts of the mains disconnection contactor are unintentionally welded together. In this case in particular, it is advantageous to be able to use the further mains disconnection contactor in series with the mains disconnection contactor to interrupt the voltage or to disconnect the mains. The further mains disconnection contactor may also be designed without an arc extinguishing chamber as a result of the further mains disconnection circuit.

The further mains disconnection circuit may in particular be connected in parallel with all of the mains disconnection contactors or cross-connection switches.

Also described is a method in which an AC charging device for a motor vehicle is operated. The following steps are performed:
  opening a mains connection switch of the AC charging device, which electrically connects a mains to an in particular passive rectifier of the AC charging device, in particular directly, if the mains connection switch is not open;
  applying voltage from the mains to the AC charging device;
  precharging a smoothing capacitor of the AC charging device through a precharge circuit arranged between a mains connection of the AC charging device and the smoothing capacitor; and
  closing the mains connection switch if the smoothing capacitor is precharged.

What is provided as one important concept is that the smoothing capacitor is precharged by at least one in particular normally off transistor of the precharge circuit. This is preferably connected in series, and is in particular connected in series with a precharge resistor of the precharge circuit.

Advantageous embodiments of the AC charging device according to the invention should be regarded as advantageous embodiments of the method according to the invention. The relevant components of the AC charging device are each designed to perform the respective method steps.

Further features of the invention emerge from the claims, the figures and the description of the figures.

Exemplary embodiments of the invention will be explained in more detail below on the basis of schematic drawings.

DETAILED DESCRIPTION OF THE INVENTION

In the figures, identical or functionally identical elements are provided with identical reference signs.

Figure 1:
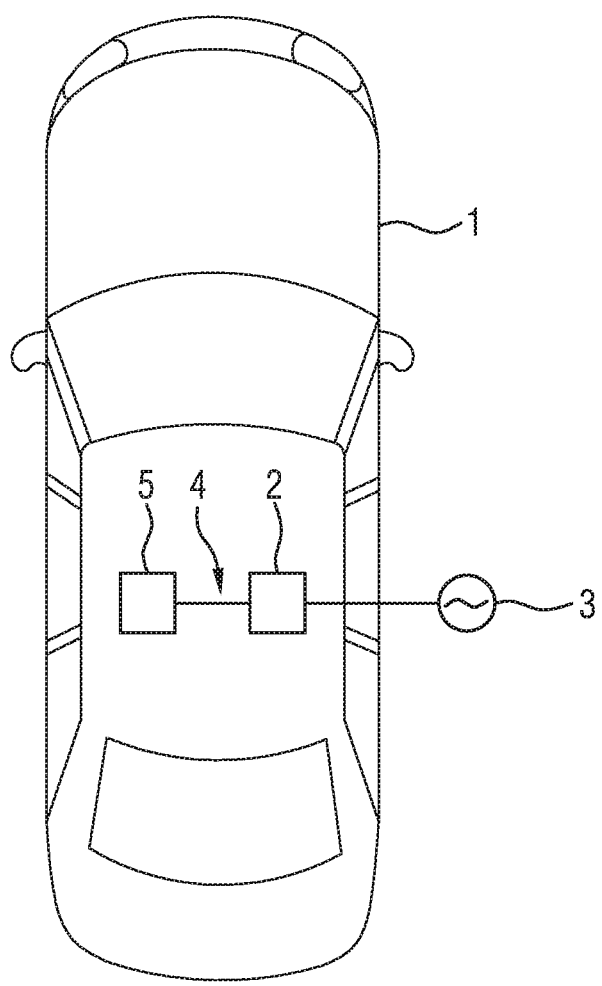
FIG. 1 shows a schematic top-down illustration of a motor vehicle with an AC charging device according to the invention.

FIG. 1 shows a schematic top-down illustration of a motor vehicle 1 with an AC charging device 2. According to the exemplary embodiment, the AC charging device 2 is in the charging state and is connected to a mains 3. The mains 3 provides AC current. The AC charging device is furthermore electrically connected to a traction battery 5 of the motor vehicle 1 via an on-board power system 4 of the motor vehicle 1. According to the exemplary embodiment, the on-board power system 4 is designed as a high-voltage on-board power system of for example 400 V.

Figure 2:
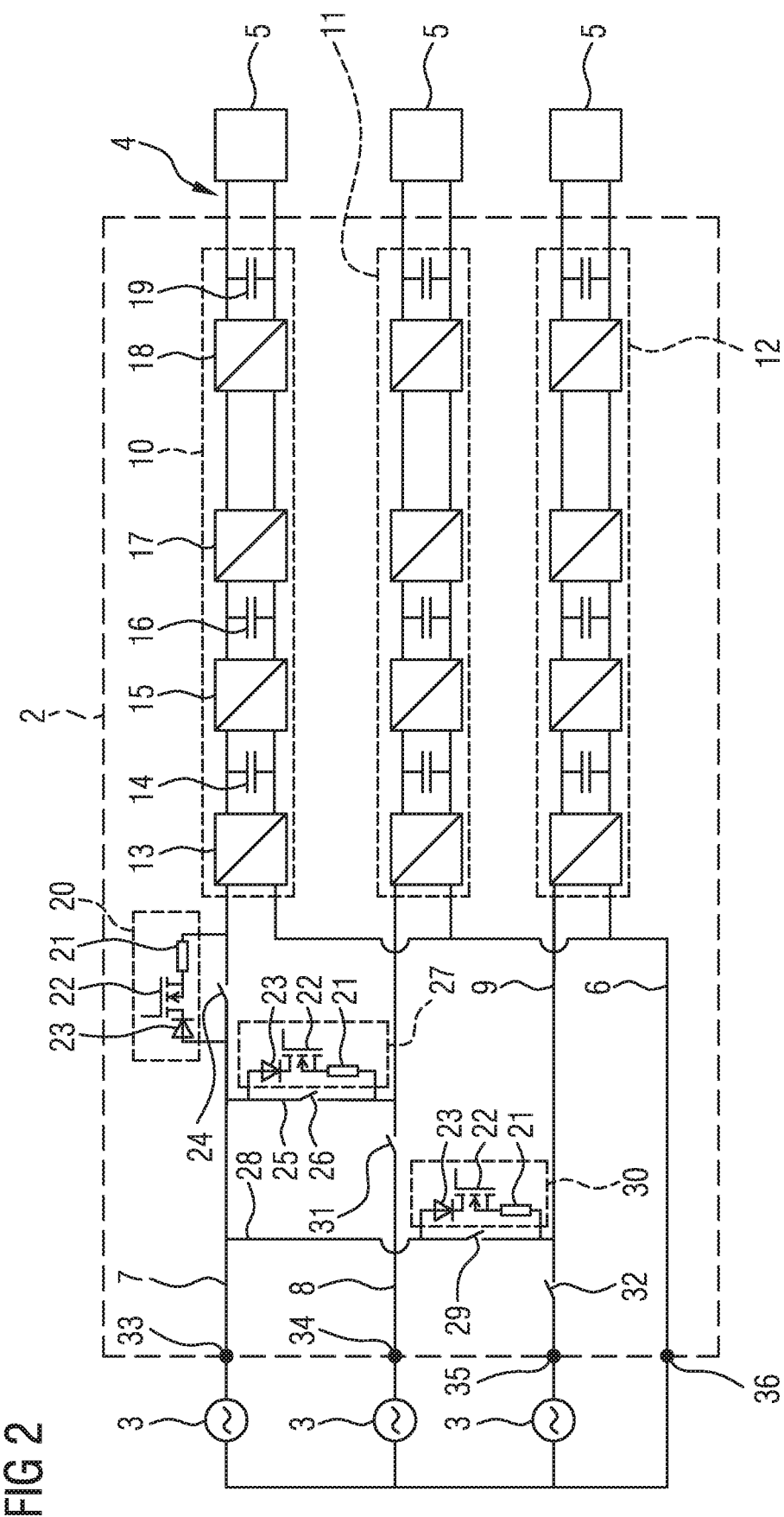
FIG. 2 shows an exemplary embodiment of the AC charging device with a precharge circuit with a transistor and two cross-connection lines, each with a cross-connection switch.

FIG. 2 shows the AC charging device 2. The AC charging device 2 has a neutral conductor 6, a first phase conductor 7, a second phase conductor 8 and a third phase conductor 9. The neutral conductor 6 and at least the first phase conductor 7 are electrically connected to the mains 3.

The first phase conductor 7 is electrically connected to a first branch 10 of the AC charging device 2. The second phase conductor 8 is directly electrically connected to a second branch 11 of the AC charging device 2. The third phase conductor 9 is directly electrically connected to a third branch 12 of the AC charging device 2. According to the exemplary embodiment, the first branch 10 is designed identically to the second branch 11 or to the third branch 12. The first branch 10 is described below as an example for the other two branches 11, 12.

The first branch 10 of the AC charging device has a first passive rectifier 13, a first smoothing capacitor 14, a DC-to-DC voltage converter 15, a second smoothing capacitor 16, an inverter 17, a second rectifier 18 and a third smoothing capacitor 19. A transformer may be arranged between the inverter 17 and the second rectifier 18. The transformer may lead to galvanic isolation between the mains 3 and the on-board power system 4. However, the AC charging device is preferably designed without the transformer, as a result of which the mains 3 and the on-board power system 4 are galvanically connected.

According to the exemplary embodiment, a first precharge circuit 20 is arranged in the first phase conductor 7. According to the exemplary embodiment, the first precharge circuit 20 comprises a precharge resistor 21, a normally-off transistor 22 and a diode 23. The forward direction of the diode 23 runs from the mains 3 to the first smoothing capacitor 14.

The first smoothing capacitor 14 and/or the second smoothing capacitor 16 and/or the third smoothing capacitor 19 are/is precharged via the first precharge circuit 20. If the smoothing capacitors 14, 16, 19 are precharged, that is to say brought to the voltage of the mains 3 as a result, a first mains disconnection contactor 24 of the first phase conductor 7, connected in parallel with the first precharge circuit 20, is closed. After the first mains disconnection contactor 24 has been closed, the current flows substantially via the first mains disconnection contactor 24 and no longer via the first precharge circuit 20. The first mains disconnection contactor 24 is designed for 16 A according to the exemplary embodiment. The first mains disconnection contactor 24 may however also be designed for a wide variety of other currents.

The first phase conductor 7 is furthermore electrically connected to the second phase conductor 8 via a first cross-connection line 25. The first cross-connection line 25 has a second mains disconnection contactor 26. A second precharge circuit 27 of the first cross-connection line 25 is arranged in parallel with the second mains disconnection contactor 26. According to the exemplary embodiment, the first cross-connection switch is designed identically to the first mains disconnection contactor 24. The second precharge circuit 27 is furthermore designed in particular identically to the first precharge circuit 20.

The first phase conductor 7 is furthermore electrically connected to the third phase conductor 9 by a second cross-connection line 28. The second cross-connection line 28 has a second cross-connection switch 29 and a third precharge circuit 30. According to the exemplary embodiment, the second cross-connection switch 29 and the third precharge circuit 30 are arranged in parallel with one another.

The precharge circuits 20, 27, 30 are preferably designed identically. The cross-connection switches 26, 29 are furthermore also preferably designed identically.

The second phase conductor 8 has a second mains disconnection contactor 31. The third phase conductor 9 has a third mains disconnection contactor 32. The mains disconnection contactors 24, 31, 32 are preferably designed identically. An electrical connection between a mains connection 32 of the first phase conductor 7 and the first branch 10 may be interrupted by the first mains disconnection contactor 24. An electrical connection between a mains connection 34 of the second phase conductor 8 and the second branch 11 may be interrupted by the second mains disconnection contactor 31. An electrical connection between a mains connection 35 of the third phase conductor 9 and the third branch 12 may be interrupted by the third mains disconnection contactor 32. The mains connections 33, 34, 35 may be designed for example as pins of a plug. The plug may be designed for example as a three-phase plug that has three pins as the mains connections 33, 34, 35 of the phase conductors 7, 8, 9 and a further pin as a mains connection 36 of the neutral conductor 6.

The first cross-connection line 25 makes it possible for the second branch 11 to be supplied with power if only the mains connection 33 of the first phase conductor 7 is connected to the mains 3 while the mains connection 34 of the second phase conductor 8 is not connected to the mains 3. Similarly, the third branch 12 may be supplied with power via the second cross-connection line 28 if only the mains connection 33 of the first phase conductor 7 is electrically connected to the mains 3 and neither the mains connection 34 of the second phase conductor 8 and/or the mains connection 35 of the third phase conductor 9 is connected to the mains 3.

Figure 3:
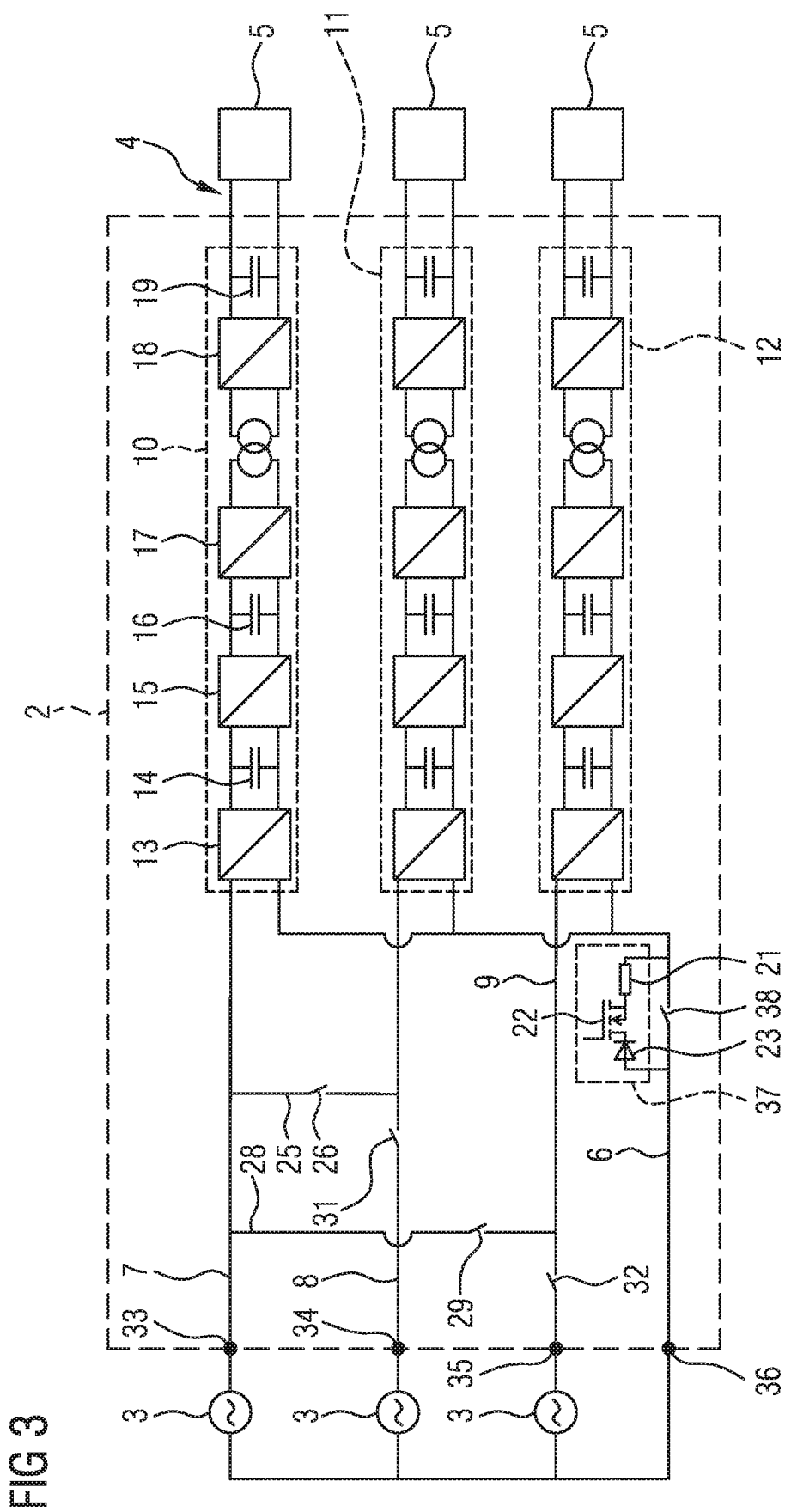
FIG. 3 shows a schematic illustration of a further exemplary embodiment of the AC charging device with the precharge circuit, which is arranged in a neutral conductor of the AC charging device.

FIG. 3 shows a further exemplary embodiment of the AC charging device 2, which is designed analogously to the exemplary embodiment according to FIG. 2, wherein, instead of the first precharge circuit 20, the second precharge circuit 27 and the third precharge circuit 30, a further precharge circuit 37 is arranged in the neutral conductor 6. The further precharge circuit 37 is in particular designed identically to the first precharge circuit 20 shown in the exemplary embodiment according to FIG. 2. According to the exemplary embodiment of FIG. 3, the first phase conductor 7, the second phase conductor 8 and the third phase conductor 9 do not have a precharge circuit.

Figure 4:
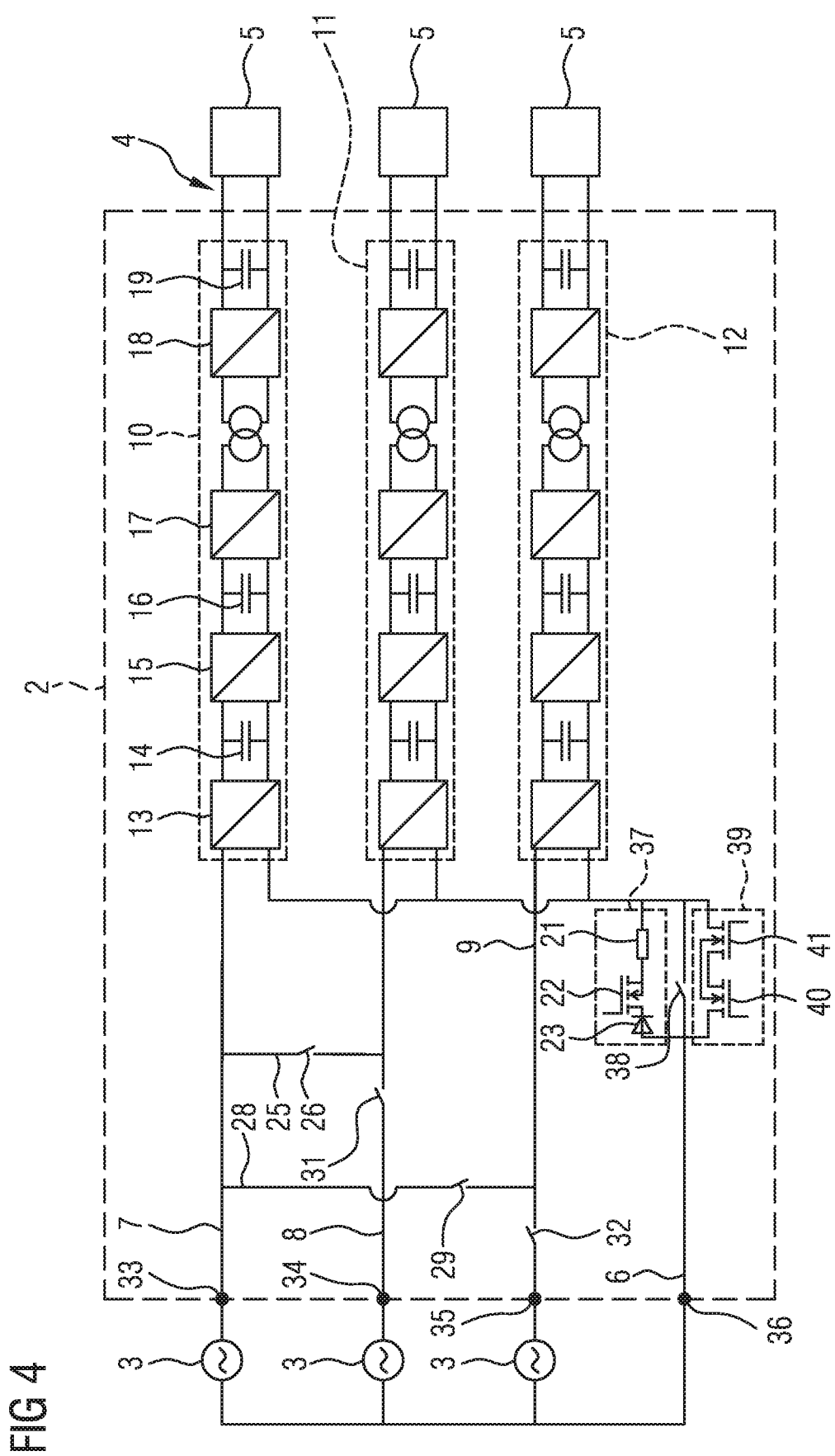
FIG. 4 shows a schematic illustration of a further exemplary embodiment of the AC charging device with a mains disconnection circuit, which has two transistors connected to one another in antiseries.

FIG. 4 shows a further exemplary embodiment of the AC charging device 2. The AC charging device 2 according to the exemplary embodiment of FIG. 4 is designed analogously to the exemplary embodiment according to FIG. 3, wherein the neutral conductor 6 has a fourth mains disconnection contactor 38 and a mains disconnection circuit 39 is arranged in parallel with the fourth mains disconnection contactor 38. According to the exemplary embodiment, the mains disconnection circuit 39 is likewise arranged in parallel with the further precharge circuit 37. As a result of the mains disconnection circuit 39, the fourth mains disconnection contactor 38 is designed in particular without a spark extinguishing chamber. If the AC charging device 2 is connected to the mains 3 and the fourth mains disconnection contactor 38 is opened, then the current flows through the higher-resistance mains disconnection circuit 39, as a result of which the arc that normally occurs without the mains disconnection circuit 39 does not occur.

According to the exemplary embodiment, the mains disconnection circuit 39 has a first transistor 40 and a second transistor 41. The first transistor 40 and the second transistor 41 are connected to one another in antiseries.

Figure 5:
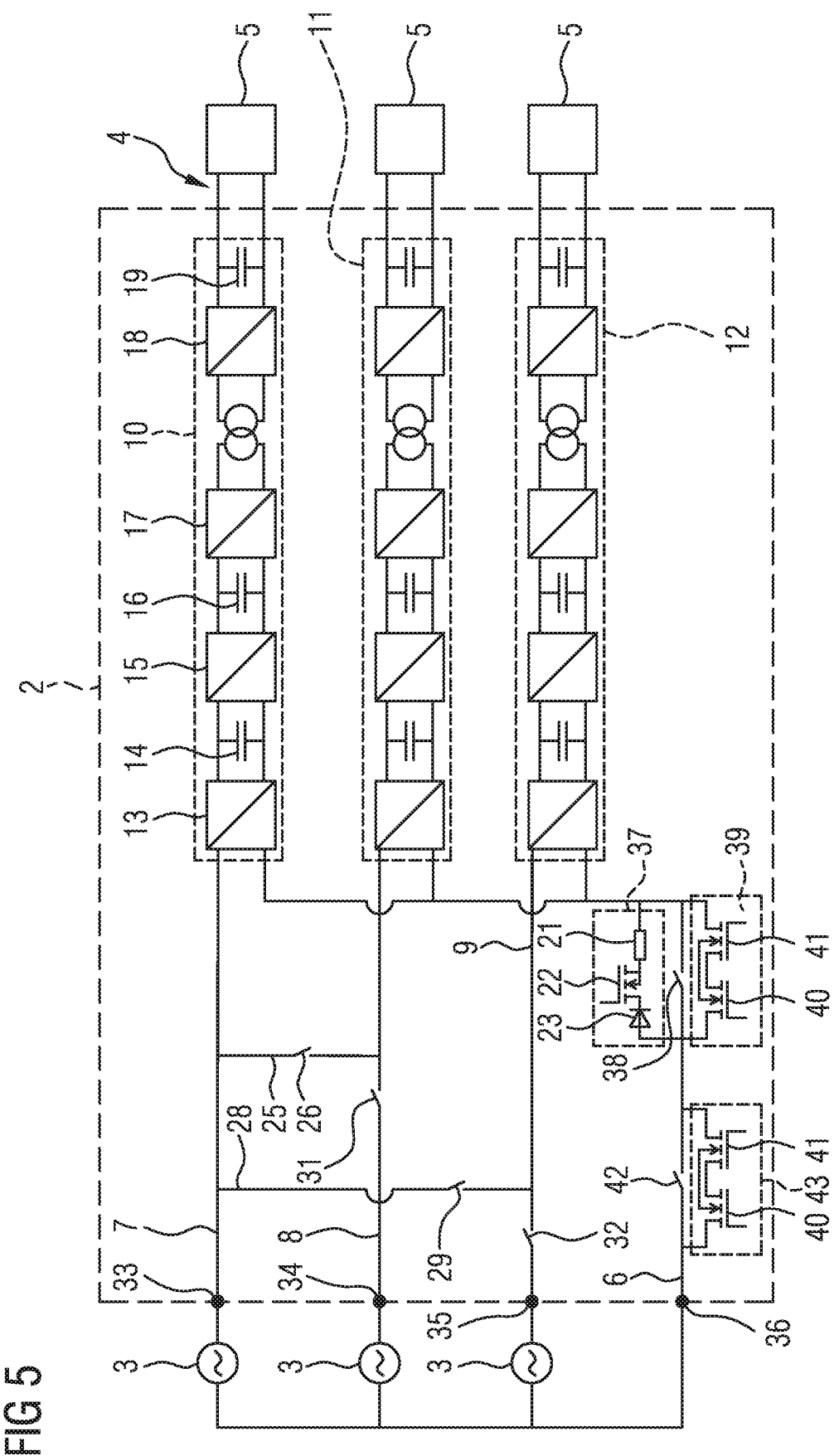
FIG. 5 shows a schematic illustration of a further exemplary embodiment of the AC charging device with the mains disconnection circuit, which has a transistor and a diode.

FIG. 5 shows a further exemplary embodiment of the AC charging device 2, which is designed analogously to the exemplary embodiment according to FIG. 4, wherein the neutral conductor 6 has a further mains disconnection contactor 42 and a further mains disconnection circuit 43 is arranged in parallel with the further mains disconnection contactor 42. The further mains disconnection contactor 42 is arranged in series with the fourth mains disconnection contactor 38.

In one embodiment that is not illustrated, the further mains disconnection circuit 43 may also be arranged in parallel with the first mains disconnection contactor 24 and/or the second mains disconnection contactor 31 and/or the third mains disconnection contactor 32 and/or the first cross-connection switch 26 and/or the second cross-connection switch 29.

Figure 6:
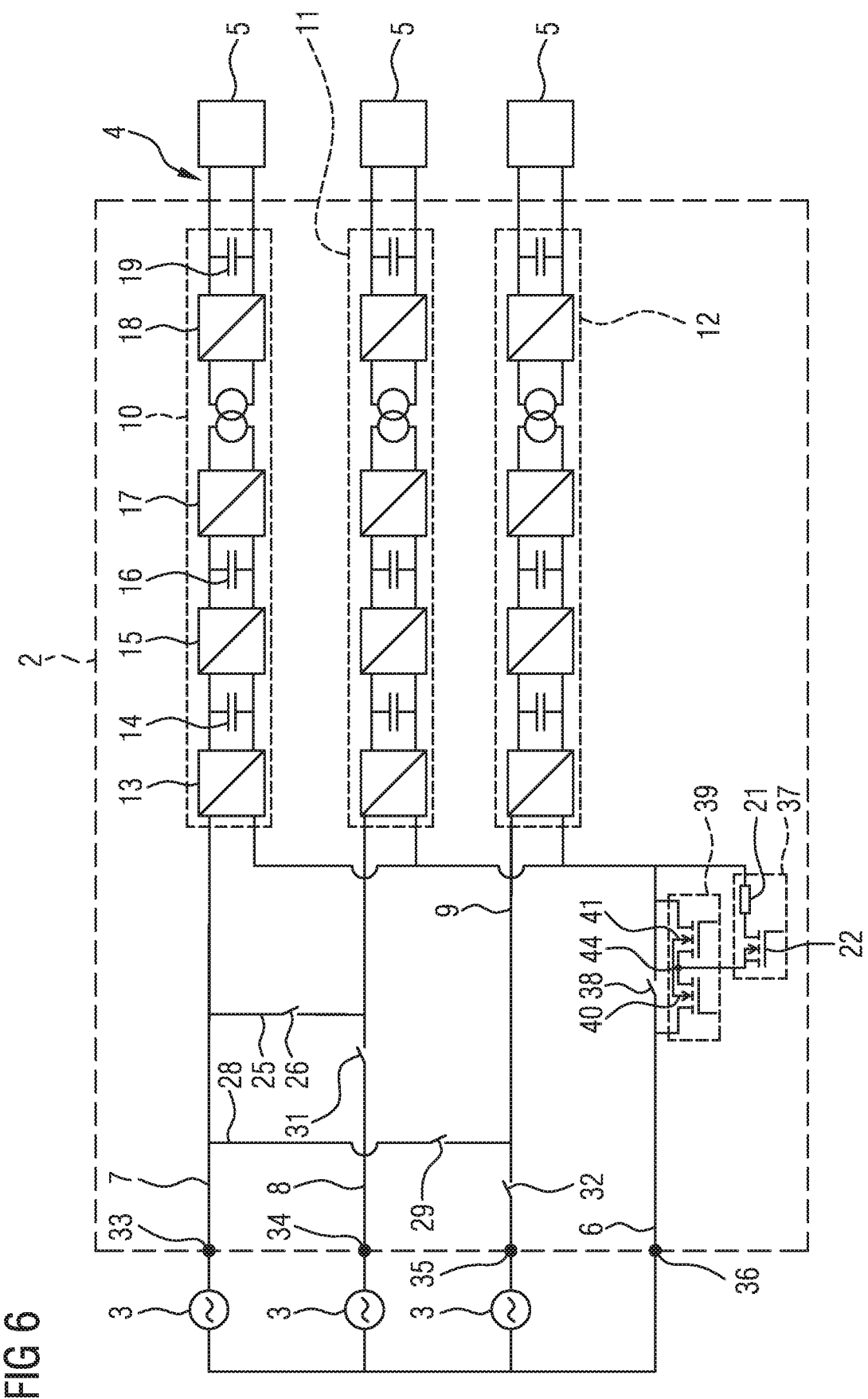
FIG. 6 shows a schematic illustration of a further exemplary embodiment of the AC charging device with a connection point between two semiconductor elements of the mains disconnection circuit and the precharge circuit connected to the connection point.

FIG. 6 shows a further exemplary embodiment of the AC charging device 2, which is designed analogously to the exemplary embodiment according to FIG. 5, wherein a connection point 44 is between the two semiconductor elements or transistors 40, 41 of the mains disconnection circuit 39 and the further precharge circuit 37 is electrically connected to the connection point 44. The first transistor 40 is thus connected in series with the transistor 22 of the further precharge circuit 37. According to the exemplary embodiment, the further precharge circuit 37 does not have a diode 23, but rather only the precharge resistor 21 and the transistor 22.

Figure 7:
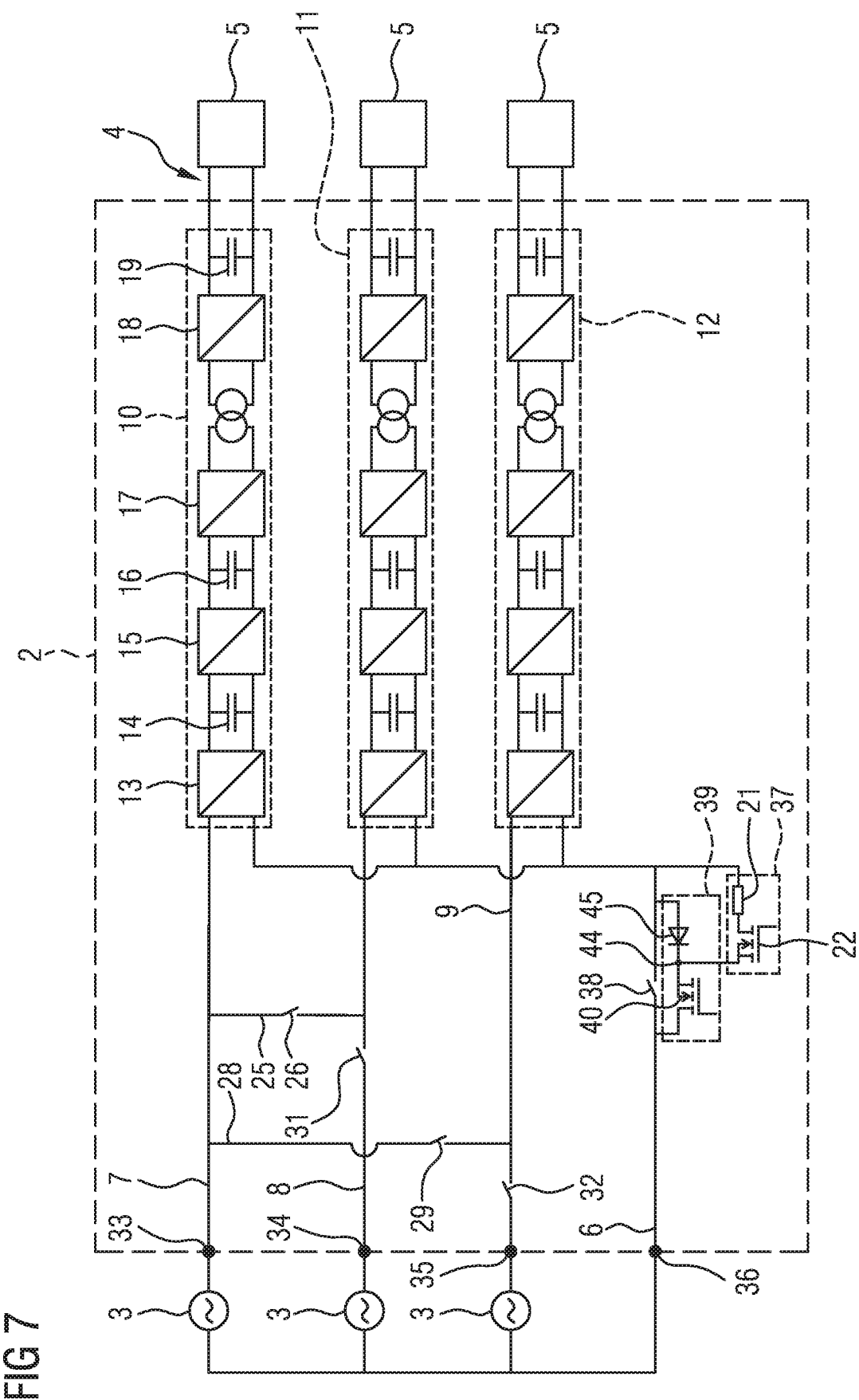
FIG. 7 shows a schematic illustration of a further exemplary embodiment of the AC charging device with the mains disconnection circuit with a transistor and a diode.

FIG. 7 shows a further exemplary embodiment of the AC charging device 2, which is designed analogously to the exemplary embodiment according to FIG. 6. However, the mains disconnection circuit 39 has a diode 45 instead of the second transistor 41.

According to one exemplary embodiment that is not illustrated in more detail, as an alternative to the second transistor 41, the first transistor 40 may also be replaced by the diode 45. The mains disconnection circuit 39 may thus be formed by the diode 45 and the second transistor 41.

LIST OF REFERENCE SIGNS

1 Motor vehicle
2 AC charging device
3 Mains
4 On-board power system
5 Traction battery
6 Neutral conductor
7 First phase conductor
8 Second phase conductor
9 Third phase conductor
10 First branch
11 Second branch
12 Third branch
13 First rectifier
14 First smoothing capacitor
15 DC-to-DC voltage converter
16 Second smoothing capacitor
17 Inverter
18 Second rectifier
19 Third smoothing capacitor
20 First precharge circuit
21 Precharge resistor
22 Transistor
23 Diode
24 First mains disconnection contactor
25 First cross-connection line
26 First cross-connection switch
27 Second precharge circuit
28 Second cross-connection line
29 Second cross-connection switch
30 Third precharge circuit
31 Second mains disconnection contactor
32 Third mains disconnection contactor
33 Mains connection of the first phase conductor
34 Mains connection of the second phase conductor
35 Mains connection of the third phase conductor
36 Mains connection of the neutral conductor
37 Further precharge circuit
38 Fourth mains disconnection contactor
39 Mains disconnection switch
40 First transistor of the mains disconnection switch
41 Second transistor of the mains disconnection switch
42 Further mains disconnection contactor
43 Further mains disconnection switch
44 Connection point
45 Diode

The invention claimed is:

1. An AC charging device for a motor vehicle, the AC charging device comprising:
   a neutral conductor and at least one phase conductor;
   at least one rectifier connected with said neutral conductor and said at least one phase conductor;
   a smoothing capacitor connected to said at least one rectifier; and
   a precharge circuit connected between a mains connection of the AC charging device and said smoothing capacitor, said precharge circuit being configured to precharge said smoothing capacitor,
   wherein said precharge circuit has at least one transistor and a precharge resistor connected in series with one another.

2. The AC charging device according to claim 1, wherein said precharge circuit comprises a diode connected upstream of said at least one transistor with respect to said smoothing capacitor.

3. The AC charging device according to claim 1, wherein said precharge circuit is arranged in said at least one phase conductor.

4. The AC charging device according to claim 1, wherein said at least one phase conductor and at least one further phase conductor are connected by way of a cross-connection line, and said cross-connection line has a cross-connection switch for disconnecting said phase conductor from said further phase conductor.

5. The AC charging device according to claim 4, which comprises a further precharge circuit connected in said cross-connection line, wherein said further precharge circuit is designed identically to said precharge circuit.

6. The AC charging device according to claim 1, wherein said precharge circuit is arranged in said neutral conductor.

7. The AC charging device according to claim 1, further comprising a mains disconnection contactor between said mains connection and said at least one rectifier, and a mains disconnection circuit formed in parallel with said mains disconnection contactor.

8. The AC charging device according to claim 7, wherein said precharge circuit is connected in parallel with said mains disconnection contactor.

9. The AC charging device according to claim 7, wherein said precharge circuit is connected in parallel with said mains disconnection circuit.

10. The AC charging device according to claim 7, wherein said mains disconnection circuit has two semiconductor elements.

11. The AC charging device according to claim 10, wherein said two semiconductor elements of said mains disconnection circuit are two transistors connected to one another in antiseries.

12. The AC charging device according to claim 10, wherein one of said two semiconductor elements of said mains disconnection circuit is a diode.

13. The AC charging device according to claim 7, wherein said precharge circuit is electrically connected to a connection node between said two semiconductor elements of said mains disconnection circuit.

14. The AC charging device according to claim 1, further comprising a further mains disconnection contactor between the mains connection and said at least one rectifier and a further mains disconnection circuit formed in parallel with said further mains disconnection contactor, and wherein said further mains disconnection contactor is formed in series with said precharge circuit.

15. A method of operating an AC charging device for a motor vehicle, the method comprising:
opening a mains disconnection contactor of the AC charging device, wherein the mains disconnection contactor forms an electrical connection between a mains and a rectifier of the AC charging device, when the mains disconnection contactor is not open;
applying a voltage from the mains to the AC charging device;
precharging a smoothing capacitor of the AC charging device by way of a precharge circuit connected between a mains connection of the AC charging device and the smoothing capacitor, and thereby charging the smoothing capacitor by a current that flows at least through a series circuit of the precharge circuit formed by a transistor and a precharge resistor; and
closing the mains disconnection contactor when the smoothing capacitor is precharged.

* * * * *